United States Patent
Kuroki et al.

(10) Patent No.: US 7,952,604 B2
(45) Date of Patent: May 31, 2011

(54) IMAGE FORMING APPARATUS

(75) Inventors: Kenji Kuroki, Toride (JP); Takashi Fujimori, Moriya (JP); Hiroyuki Eda, Moriya (JP)

(73) Assignee: Canon Kabushiki Kaisha (JP)

( * ) Notice: Subject to any disclaimer, the term of this patent is extended or adjusted under 35 U.S.C. 154(b) by 1023 days.

(21) Appl. No.: 11/761,352

(22) Filed: Jun. 11, 2007

(65) Prior Publication Data

US 2007/0285738 A1    Dec. 13, 2007

(30) Foreign Application Priority Data

Jun. 12, 2006    (JP) .................................. 2006-162573

(51) Int. Cl.
*B41J 27/00*    (2006.01)
(52) U.S. Cl. ........................................................ 347/261
(58) Field of Classification Search .................. 347/224, 347/231, 243, 249–261
See application file for complete search history.

(56) References Cited

U.S. PATENT DOCUMENTS

| 4,809,025 A | * | 2/1989 | Noguchi | 347/261 |
| 6,400,384 B1 | * | 6/2002 | Kuwabara | 347/129 |

FOREIGN PATENT DOCUMENTS

| JP | 05188311 A | * | 7/1993 |
| JP | 07-273951 A | | 10/1995 |

* cited by examiner

*Primary Examiner* — Hai C Pham
(74) *Attorney, Agent, or Firm* — Rossi, Kimms & McDowell LLP (57) ABSTRACT

An image forming apparatus capable of shortening first copy time to thereby reduce wait time before execution of a print job and prolonging the service life of a scanner motor at the same time. An image forming apparatus that forms a latent image on a photosensitive drum in response to a copy start instruction signal. A scanner motor drives a rotating polygonal mirror that scans the photosensitive drum by reflecting light, for rotation. A counter counts the number of times of start of the motor. A control circuit causes the scanner motor to be started up before the signal is generated, if the count of the counter is less than a predetermined value, and to cause the scanner motor to be started up upon generation of the signal, if the count of the counter is not less than the predetermined value.

6 Claims, 9 Drawing Sheets

| SCANNER MOTOR NAME | SCANNER MOTOR K | SCANNER MOTOR Y | SCANNER MOTOR M | SCANNER MOTOR C |
|---|---|---|---|---|
| START COUNT-BASED LIFE VALUE [NUMBER OF TIMES] | 800000 | 600000 | 600000 | 600000 |
| START COUNT-BASED LIFE COEFFICIENT | 0.95 | 0.95 | 0.95 | 0.95 |
| START COUNT-BASED LIFE WARNING VALUE [NUMBER OF TIMES] | 760000 | 570000 | 570000 | 570000 |

IMAGE FORMING APPARATUS

BACKGROUND OF THE INVENTION

1. Field of the Invention

The present invention relates to an image forming apparatus using an electrophotographic process.

2. Description of the Related Art

Today, an image forming apparatus, such as a copying machine and a printer, using an electrophotographic process, is demanded to perform image formation at an even higher speed, and hence, as a means for forming an electrostatic latent image on an image bearing member, there is employed a laser optical system that emits a laser beam from a semiconductor laser to a polygonal mirror (rotary polygonal mirror). The polygonal mirror is a polyhedron having four to twelve faces, and is irradiated with the laser beam while being rotated at high speed, whereby formation of an electrostatic latent image in a main scanning direction (i.e. in the longitudinal direction of the image bearing member) is realized.

A motor for driving the polygonal mirror for rotation is called a scanner motor. The scanner motor starts rotation when a user presses a copy start key or the like to cause the apparatus to start a copying operation. A stable latent image cannot be formed before the scanner motor comes to rotate stably at a predetermined speed, and therefore the image forming apparatus is controlled such that a shift to an image forming sequence takes place only after a sign indicative of stabile rotation of the scanner motor has been detected.

Since the scanner motor rotates the polygonal mirror, it has a large inertia, so that it is known to take long time before the rotation of the scanner motor becomes stabile. Further, it is necessary to cause the scanner motor to rotate at a very high speed in accordance with a recent increase in the operating speed of the image forming apparatus, and hence it tends to take more time (spin-up time) from when the scanner motor at rest is started to when the scanner motor comes to stably rotate at a predetermined speed.

An image forming operation cannot be started unless the scanner motor is in a stable rotating state, and hence, in general, in the image forming apparatus using the laser optical system, a first copy (print) time, i.e. a time period from pressing of the copy start key to output of a first sheet depends on a time period required for the scanner motor to spin up.

In view of this, an image forming apparatus has been proposed in Japanese Laid-Open Patent Publication (Kokai) No. H07-273951, which has a function of starting rotation of the scanner motor prior to pressing the copy start key so as to shorten the first copy time and reduce the load on the user.

However, the prior rotation control of the scanner motor is executed before the copying operation is started (before a copy start instruction signal is generated), based on a prediction that a user will start a print (copy) job (i.e. in response to a sign of image formation, i.e. in response to an operation on the image forming apparatus), but the print job is not necessarily started after execution of the prior rotation control.

When the print job is not carried out after all, the prior rotation control of the scanner motor comes to naught. More specifically, although the image formation is not carried out, the scanner motor is started, caused to rotate over a predetermined time period, and then stopped. This is not preferable to the service life of the scanner motor.

Further, it is known that since the scanner motor steadily rotates at a very high speed, the service life of the scanner motor is also limited in terms of maintaining stable rotation. After the service life of the scanner motor expires, it becomes impossible to maintain stable rotation or it takes a longer time period for the scanner motor to be started from the stopped state to reach the stably rotating state.

Since the polygonal mirror driven by the scanner motor reflects a laser beam for forming a latent image on the image bearing member, if the scanner motor cannot steadily rotate with stability, the latent image on the image bearing member is distorted, which causes degradation of image quality.

As described above, in the case where the image forming apparatus is designed such that the prior rotation of the scanner motor is not executed, it is impossible to shorten the first copy time, while in the case where the prior rotation of the scanner motor is executed, reduction of the service life of the scanner motor, in particular, is accelerated. For these reasons, it could not help but design the laser optical system such that highly durable expensive motor components are used therein beforehand.

SUMMARY OF THE INVENTION

The present invention provides an image forming apparatus which is capable of not only shortening first copy time to thereby reduce wait time before execution of a print job, but also prolonging the service life of a scanner motor.

In a first aspect of the present invention, there is provided an image forming apparatus that forms a latent image on an image bearing member in response to a copy start instruction signal, comprising a motor configured to drive a rotating polygonal mirror that scans the image bearing member by reflecting light, for rotation, a counter configured to count a number of times of start of the motor, an instruction section configured to be operable to cause the motor to be started up before the copy start instruction signal is generated, if a count of the counter is less than a predetermined value, and to cause the motor to be started up upon generation of the copy start instruction signal, if the count of the counter is not less than the predetermined value.

The image forming apparatus according to the first aspect of the present invention maintains the stopped state of the scanner motor for prior rotation control depending on the cumulative number of times of the start of the scanner motor, whereby it is possible to execute prior rotation according to the current conditions concerning the service life of the scanner motor. Therefore, it is possible not only to reduce wait time before execution of a print job, but also to prolong the service life of the scanner motor.

The instruction section can include a detection unit configured to detect an operation performed on the image forming apparatus, and when the count of the counter is less than the predetermined value, can cause the motor to be started up depending on a result of the detection by the detection unit before generation of the copy start instruction signal.

The counter can include an up-counter configured to increment the count of the counter by 1 when the instruction section has caused the motor to be started up.

The image forming apparatus can comprise a post-operation rotation control section configured to perform post-operation rotation control of the motor after completion of an image forming operation, so as to keep ready for a next image forming operation, irrespective whether the count of the motor is less than the predetermined value or not.

In a second aspect of the present invention, there is provided an image forming apparatus that forms a latent image on an image bearing member in response to a copy start instruction signal, comprising a motor configured to drive a rotating polygonal mirror that scans the image bearing member by reflecting light, for rotation at a predetermined speed, a counter configured to count a number of times of start of the motor, a rotation determining section configured to determine a rotational state of the motors and an instruction section configured to be operable when the rotation determining section has determined that the motor is not rotating at the predetermined speed, to cause the motor to be started up before the copy start instruction signal is generated, if a count of the counter is less than a predetermined value, and to cause the motor to be started up upon generation of the copy start instruction signal, if the count of the counter is not less than the predetermined value.

The image forming apparatus according to the second aspect of the present invention can provide the same advantageous effects as provided by the image forming apparatus according to the first aspect of the present invention.

The instruction section can include a detection unit configured to detect an operation performed on the image forming apparatus, and when the count of the counter is less than the predetermined value, causes the motor to be started up depending on a result of the detection by the detection unit before generation of the copy start instruction signal.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
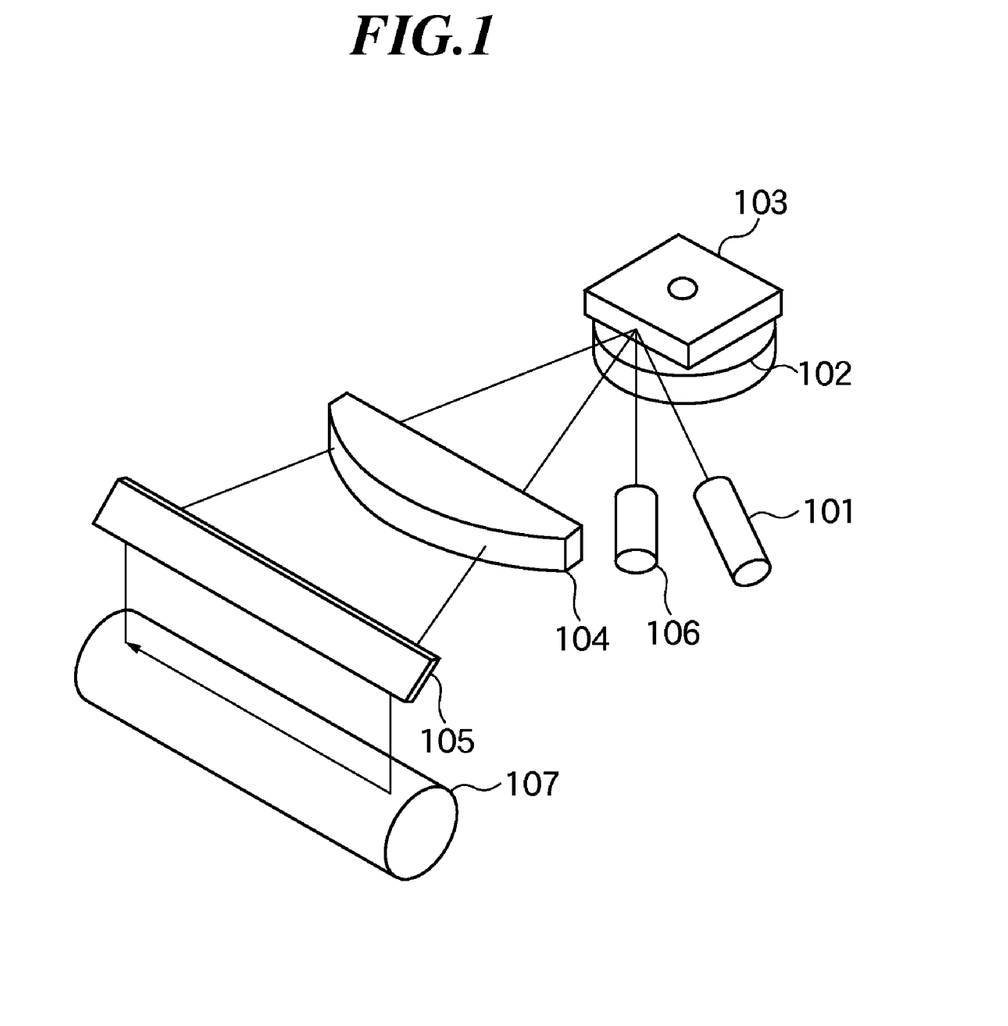
FIG. 1 is a schematic view of a laser scanner unit of an image forming apparatus according to an embodiment of the present invention.

FIG. 1 is a schematic view of a laser scanner unit in an image forming apparatus according to an embodiment of the present invention.

Referring to FIG. 1, a polygonal mirror 103 (rotating polygonal mirror) driven for rotation by a scanner motor 102 is disposed in front of a laser diode 101 as a semiconductor laser. An imaging lens 104 and a reflecting mirror 105 are arranged in a direction in which a laser beam is reflected by the polygonal mirror 103. Further, a beam detection sensor 106 for generating a reference signal is disposed in the vicinity of the imaging lens 104 in the direction in which the laser beam is reflected by the polygonal mirror 103.

The laser diode 101 generates a laser beam modulated based on an associated image signal. The laser beam is reflected by the polygonal mirror 103 which is rotating, passes through the imaging lens 104, and after being reflected by the reflecting mirror 105, reaches a photosensitive drum 107, to thereby form a latent image thereon.

Figure 2:
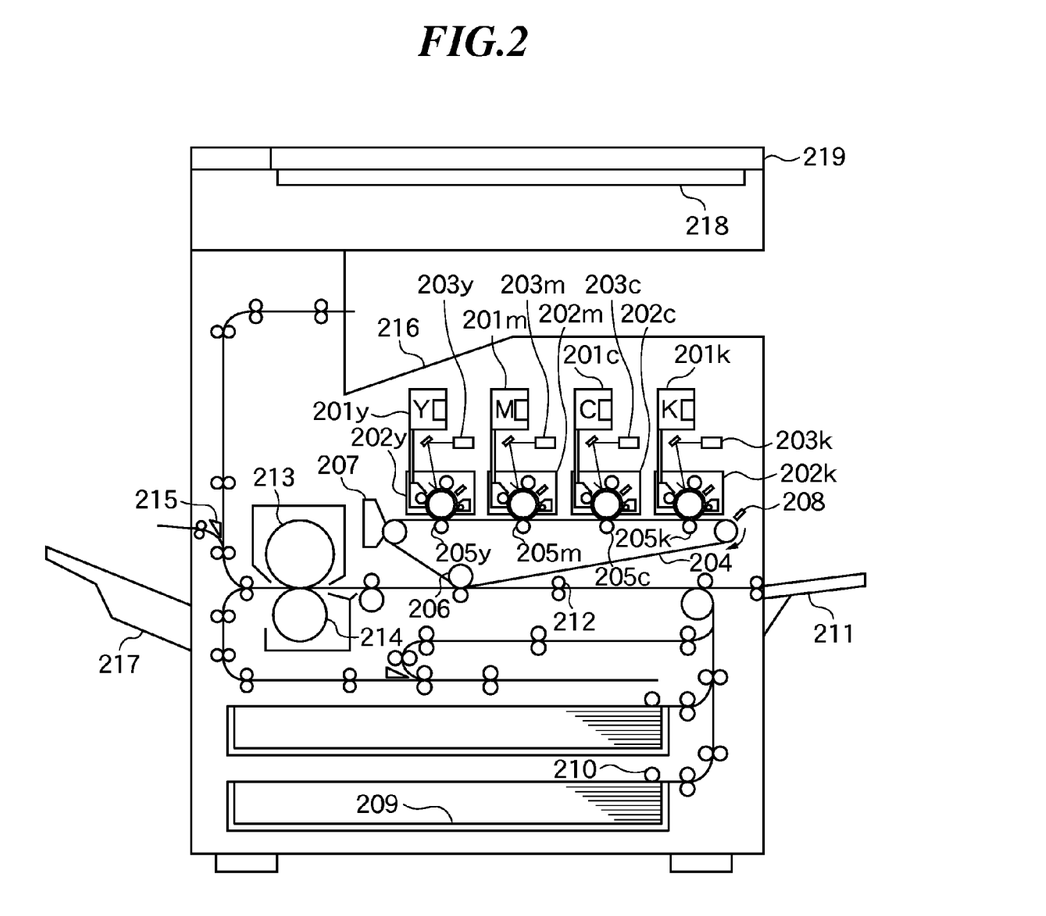
FIG. 2 is a schematic longitudinal cross-sectional view of the image forming apparatus according to the embodiment, which incorporates the laser scanner unit shown in FIG. 1.

FIG. 2 is a schematic longitudinal cross-sectional view of the image forming apparatus according to the embodiment, which incorporates the laser scanner unit shown in FIG. 1.

As shown in FIG. 2, the image forming apparatus includes sheet cassettes 209 disposed in a bottom part of an apparatus main unit, an intermediate transfer member 204 disposed in an upper part of the apparatus main unit, and four process units 202, i.e. a yellow process unit 202y, a magenta process unit 202m, a cyan process unit 202c, and a black process unit 202k arranged in a manner each facing the intermediate transfer member 204 from above. A fixing device comprised of a fixing roller 213 and a pressing roller 214 is disposed downstream of the intermediate transfer member 204 in a sheet conveying direction. Further, an original reader 219 is disposed above the apparatus main unit.

In the following, the arrangement of the image forming apparatus will be described in detail along with the operation of the same. Toner bottles 201y to 201k are filled with yellow toner, magenta toner, cyan toner, and black toner, respectively. The process units 202y to 202k each include a photosensitive drum, a developing device, an electrostatic charging roller, and a photosensitive drum cleaner. The electrostatic charging roller is provided for uniformly charging the surface of the photosensitive drum.

Laser scanner units 203y to 203k are each comprised of the components shown in FIG. 1, and each irradiate a laser beam onto the associated photosensitive drum 107 based on image information to thereby form an electrostatic latent image on the photosensitive drum 107. The formed electrostatic latent image is developed into a toner image by the associated developing device in each of the process units 202y to 202k.

The intermediate transfer member 204 is provided for having the toner images formed on the respective photosensitive drums in the respective colors primarily transferred thereon in sequential superimposed relation, and then secondarily transferring the resulting full-color toner image formed thereon onto a sheet. Primary transfer rollers 205y to 205k are provided for realizing stable primary transfer of the toner images from the respective photosensitive drums onto the intermediate transfer member 204 by performing the transfer while applying bias voltage thereto.

The toner image formed on the intermediate transfer member 204 by the primary transfer is secondarily transferred onto the sheet by a secondary transfer roller 206. Toner remaining on the intermediate transfer member 204 without being transferred onto the sheet by the secondary transfer roller 206 is collected by an intermediate transfer member cleaner 207. A reflected light amount sensor 208 detects toner density on the intermediate transfer member 204 based on the amount of reflected light.

Sheets are fed from a selected one of the sheet cassettes 209 by an associated feed roller 210 and are conveyed to a registration roller 212. Each sheet has its skew corrected by the registration roller 212, and is then sent to the secondary transfer roller 206. After having the toner image transferred thereon by the secondary transfer roller 206 and then having the tone image thermally fixed by the fixing roller 213 and the pressing roller 214, the sheet is selectively sent to an inner discharge tray 216 or a discharge tray 217 by a discharge flapper 215.

The original reader 218 scans an original set for copying, to transfer image data to a RAM 303 via a CPU 301 described hereinafter with reference to FIG. 3. A presser plate 219 plays the role of a rid to be placed on the original. The opened/closed state of the presser plate 219 can be detected from the CPU 301 by a sensor, not shown.

Figure 3:
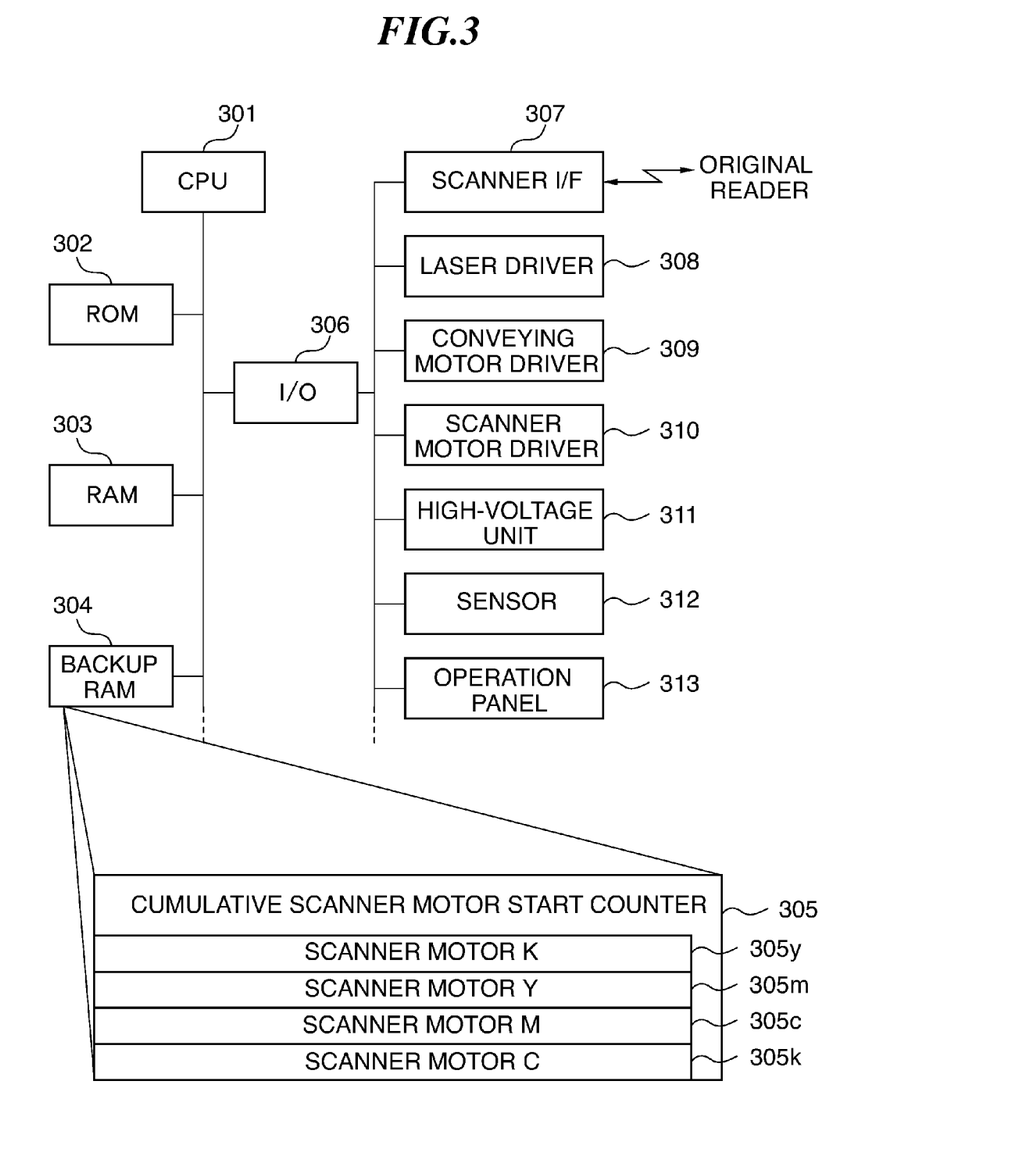
FIG. 3 is a schematic block diagram of a control circuit incorporated in the image forming apparatus shown in FIG. 2.

FIG. 3 is a schematic block diagram of a control circuit incorporated in the image forming apparatus in FIG. 2.

As shown in FIG. 3, the control circuit is formed by connecting a ROM 302, the RAM 303, and a backup RAM 304 to the CPU 301, and also connecting various component units (307 to 313 . . . ) to the same via an input/output port 306.

The CPU 301 controls the overall operation of the control circuit to execute a scanner motor prior rotation control process described hereinafter with reference to FIG. 6. The ROM 302 stores programs based on which the CPU 301 operates. The RAM 303 provides a work area for the CPU 301 and is used for temporarily storing image data.

The backup RAM 304 is provided for enabling information set by the operation of the present image forming apparatus to be stored even after the power is turned off. The backup RAM 304 is supplied with electric power by a backup battery, not shown.

The backup RAM 304 has cumulative scanner motor start counters 305 formed therein for each recording a cumulative value of the number of times of start of the associated scanner motor 102 appearing in FIG. 1. The scanner motors 102 are provided in association with the respective Y, M, C, and K colors, and therefore the cumulative scanner motor start counters 305 are also provided in association with the respective colors. The count of each cumulative scanner motor start counter 305 is incremented by 1 whenever the associated scanner motor 102 starts rotation (the scanner motor is started).

Reduction of the service life of each scanner motor 102 is caused by changes in the qualities of bearing members and lubricant, such as oil, used for the motor bearings. The quality changes basically occur depending on the number of times of spin-up for bringing the scanner motor 102 from the stopped state to the steadily rotating state and time over which the scanner motor 102 has steadily rotated.

A factor regarded as particularly crucial to the service life of the scanner motor 102 is the spin-up. Therefore, by counting the number of times of spin-up (the number of times of start) of the scanner motor 102, it is possible to estimate the remaining service life of the scanner motor 102.

The input/output port 306 of the CPU 301 provides interface with devices connected to the CPU 301. A scanner I/F 307 provides interface for connection to the original reader 218. A laser driver 308 drives the laser diode 101.

A conveying motor driver 309 drives motors and the like for conveying sheets. A scanner motor driver 310 as an instruction section controls rotation, stoppage, and rotational speed of each scanner motor 102. A high-voltage unit 311 controls high voltage for use in forming an image. A sensor 312 (detection section) appearing in FIG. 3 collectively represents a plurality of sensors including sensors for detecting the presence/absence and conveying position of a sheet, and sensors for detecting a potential, a temperature, and so forth.

The sensor 312 also includes the sensor, not shown, for detecting the opening/closing of the presser plate 219. An operation panel 313 is comprised of a ten-key numeric keypad for use in inputting the number of copies, a display panel, a copy start key, and so forth.

Figure 4A:
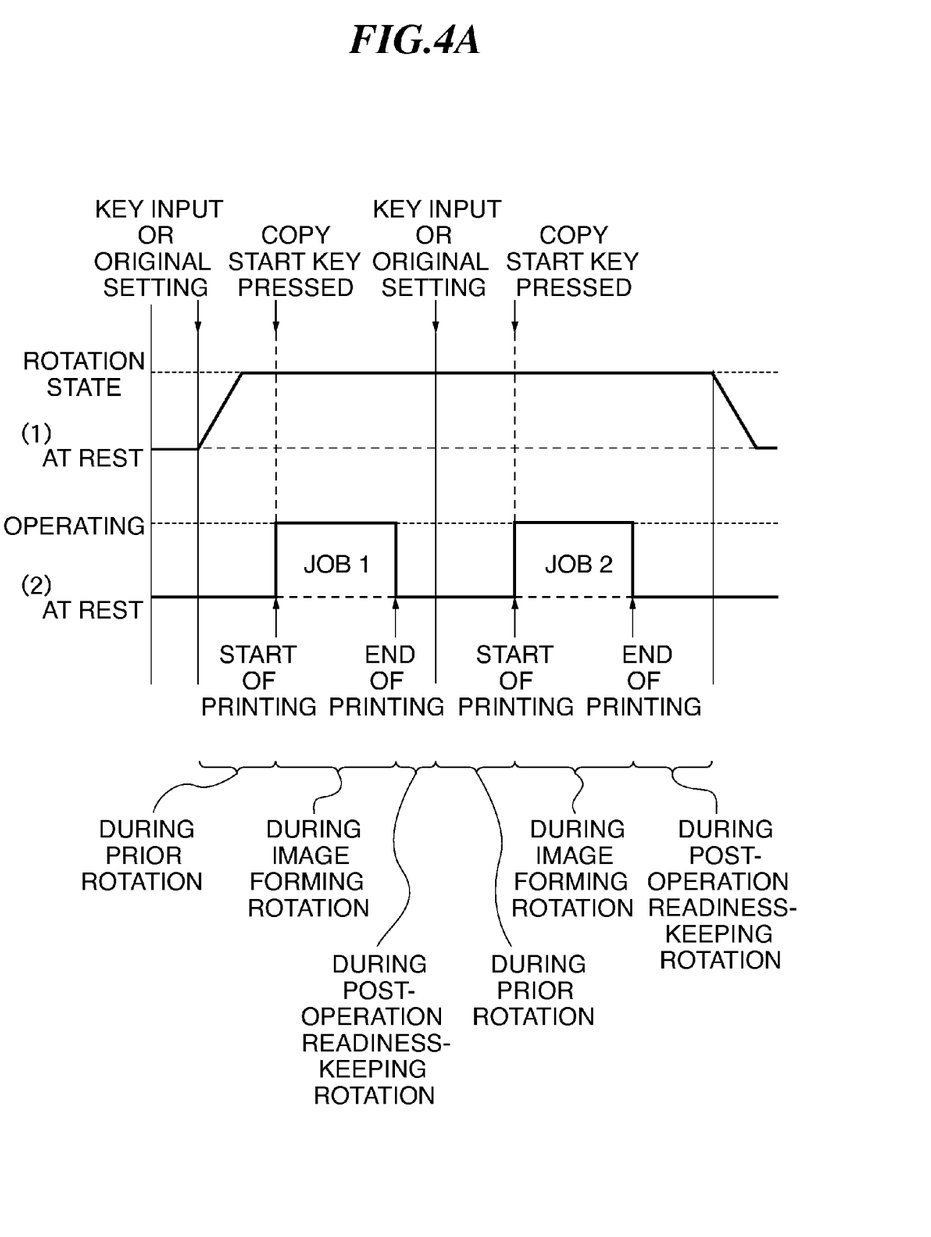
FIG. 4A is a timing diagram of prior rotation control of a scanner motor, which is executed by the control circuit in FIG. 3, in a case where a print job is input during prior rotation of the scanner motor.
Figure 4B:
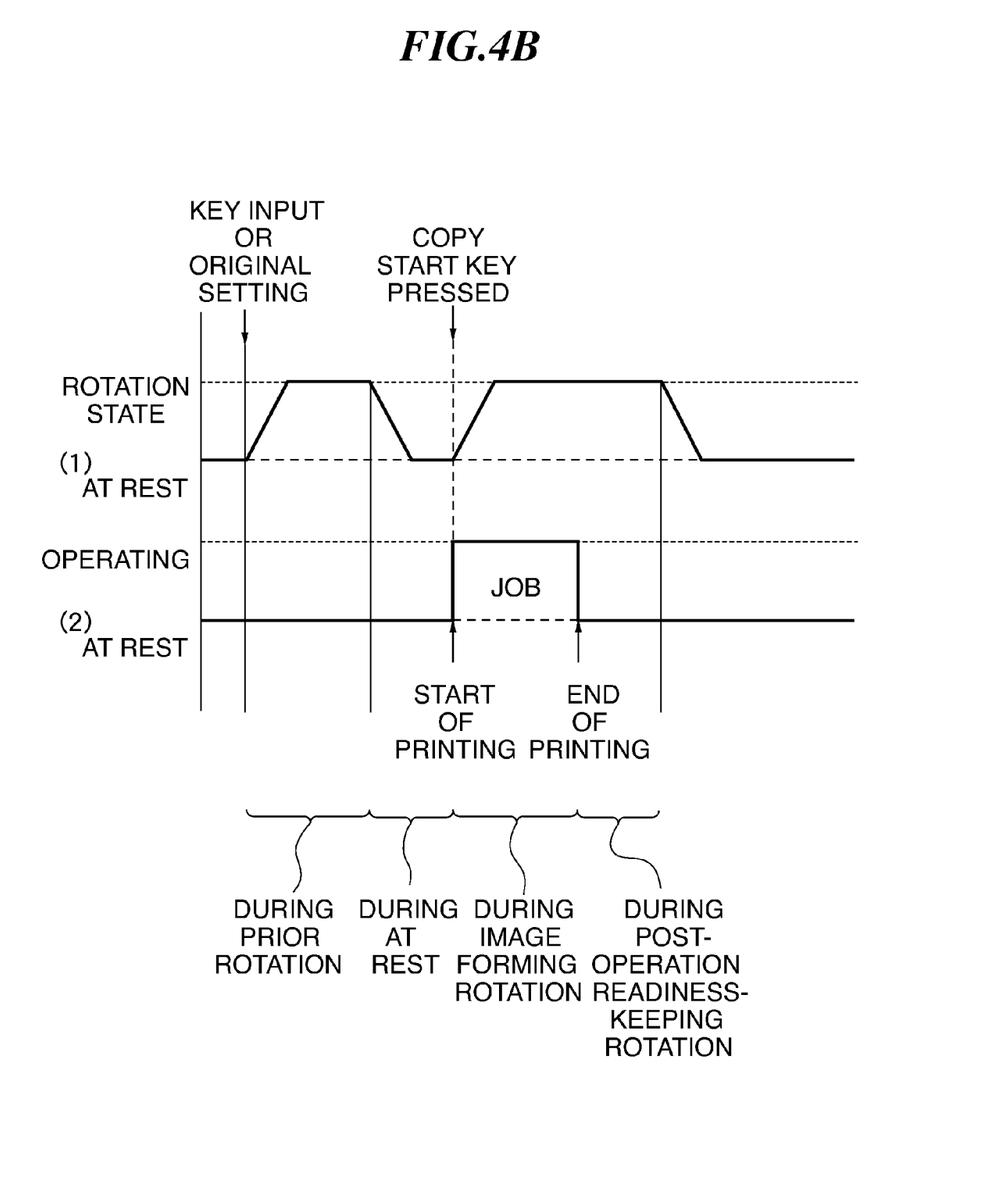
FIG. 4B is a timing diagram of prior rotation control of the scanner motor, which is executed by the control circuit in FIG. 3, in a case where no print job is input during prior rotation of the scanner motor.

FIGS. 4A and 4B are timing diagrams of prior rotation control of a scanner motor (start control responsive to a sign of image formation), which is executed by the control circuit as the instruction section shown in FIG. 3.

FIG. 4A shows a case where a print job is input during prior rotation of the scanner motor (a copy start instruction signal is generated), while FIG. 4B shows a case where no print job is input during prior rotation of the scanner motor (no copy start instruction signal is generated).

In each of FIGS. 4A and 4B, reference numeral (1) designates the rotational speed of the scanner motor 102, and reference numeral (2) designates a print job operation signal.

First, a description will be given of the case shown in FIG. 4A. When detecting pressing of any key other than the copy start key that generates the copy start instruction signal on the operation panel 313 (operation on the image forming apparatus) or opening or closing of the presser plate 219 of the original reader 218 (operation on the image forming apparatus) (i.e. in response to a sign of image formation), the CPU 301 generates a polygon prior rotation trigger (instructs to start the scanner motor in response to the sign of image formation) to thereby cause rotation of the scanner motor 102. That is, rotation control of the scanner motor 102 is not directly started in response to a print start instruction issued via the copy start key, but prior rotation control of the scanner motor 102 is started when it is detected that the user has carried out some operation, such as pressing of some key or opening or closing of the presser plate 219, on the image forming apparatus. That is, before the copy start instruction signal is generated, the start of the scanner motor is instructed in response to the sign of image formation.

In the prior rotation control of the scanner motor 102, timer setting is carried out upon the start of rotation of the scanner motor 102, and when a predetermined time period elapses without the user performing further operation, the scanner motor 102 is temporarily stopped in view of its service life.

If the user presses the copy start key on the operation panel 313 when the scanner motor 102 is rotating, a print job (image forming operation) is started. At this time, the control mode of the scanner motor shifts to an image-forming rotation mode, but since the scanner motor 102 is already rotating at a desired speed, it takes no time to change the rotational speed of the scanner motor 102.

When the print job is completed, the CPU 301 enters a post-operation readiness-keeping rotation mode for keeping the scanner motor 102 rotating over a predetermined time period so as to keep ready for a next job. When the user further presses a key on the operation panel 313 or opens or closes the presser plate 219 of the original reader 218 during the post-operation readiness-keeping rotation after completion of the job, prior rotation control is executed as described hereinbefore to thereby shift the control mode to the prior rotation mode again. However, since the scanner motor 102 is already rotating, the timer is only reset to extend time over which the scanner motor 102 is to be rotated.

When the copy start key is pressed in this state, a print job is started with the scanner motor 102 kept rotating. After completion of the job, the scanner motor 102 enters the post-operation readiness-keeping rotation mode as described above, and continues rotation over the predetermined time period. In this case, if the user carries out no operation within the predetermined time period, the scanner motor 102 is stopped by the timer upon the lapse of the predetermined time period.

Next, the case where the user does not input a print job during prior rotation control of the scanner motor will be described with reference to FIG. 4B.

As in the case shown in FIG. 4A, if pressing of any key other than the copy start key on the operation panel 313 or opening or closing of the presser plate 219 of the original reader 218 is detected, the polygon prior rotation trigger is generated. The CPU 301 causes rotation of the scanner motor 102 by this trigger and sets the timer to the predetermined time period.

When the predetermined time period elapses without the user performing any further operation, the scanner motor 102 is controlled to be once stopped by the timer for preserving the service life of the scanner motor 102.

If the user presses the copy start key when the scanner motor 102 is at rest, since the scanner motor 102 has already been stopped, the scanner motor 102 is started up again to start a print job. Then, after the rotation of the scanner motor 102 becomes stable, an image forming operation is started.

After completion of the print job, the CPU 301 holds the scanner motor 102 in its rotating state over the predetermined time period in the same manner as described with reference to FIG. 4A so as to keep ready for a next job. In this case, if the user carries out no operation within the predetermined time period, the scanner motor 102 is stopped.

As described above, when prior rotation control is started prior to the start of a copying operation or when a print job is started from the state where the scanner motor 102 is at rest, the scanner motor 102 is started up to start rotation. Whenever the scanner motor 102 starts rotation, the CPU 301 increments the count of the cumulative scanner motor start counter 305 provided in the backup RAM 304 by 1.

Service life values of the respective cumulative scanner motor start counters 305 are recorded in a ROM data table described below with reference to FIG. 5.

Figure 5:
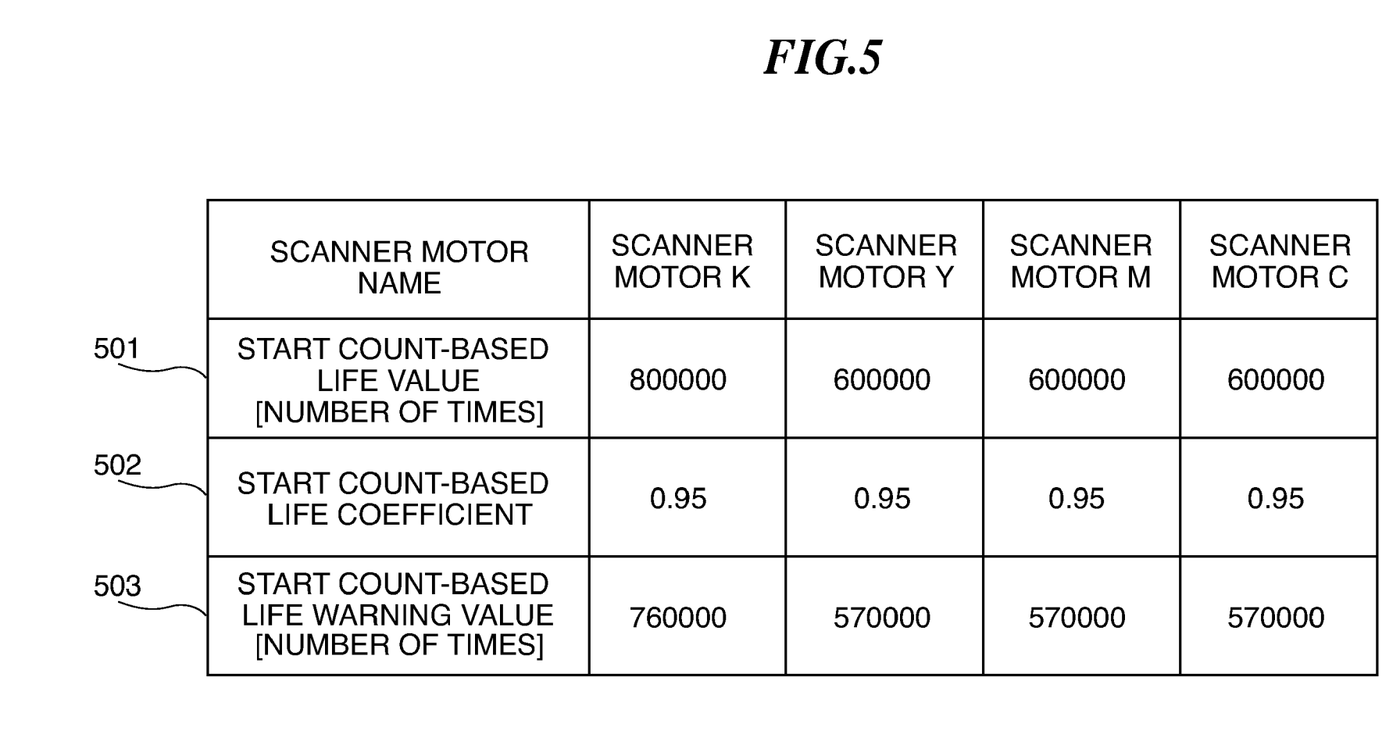
FIG. 5 is a diagram illustrating a ROM data table recorded in a ROM, which shows service life values of scanner motors.

FIG. 5 is a diagram illustrating the ROM data table showing service life values of the respective scanner motors recorded in the ROM appearing in FIG. 3.

As shown in FIG. 5, a start count-based life value 501 is indicative of a start count (the number of times of the start of the scanner motor) with reference to which it is determined whether or not the service life of the associated scanner motor 102 has expired. When the cumulative start count associated with the scanner motor 102 reaches the start count-based life value 501, it is required to promptly replace a laser scanner unit including the scanner motor 102 with a new one.

A start count-based life coefficient 502 is indicative of a ratio of the cumulative start count of a scanner motor 102 to the start count-based life value 501, which defines time to change settings for prior rotation control associated with the scanner motor 102.

A start count-based life warning value 503 defined by a predetermined value is obtained by multiplying the start count-based life value 501 by the start count-based life coefficient 502. When the count of the cumulative scanner motor start counter 305 becomes equal to or larger than the start count-based life warning value 503, the associated scanner motor 102 is controlled such that the prior rotation thereof is inhibited.

Although in the present embodiment, all data tables are recorded in the ROM 302, the start count-based life warning value 503 does not necessarily require a data table to be provided in the ROM 302. For example, the start count-based life warning value 503 obtained as a result of multiplication of the start count-based life value 501 by the start count-based life coefficient 502 may be stored in the RAM 303. In this case, an offset to the start count-based life coefficient 502 may be stored in the backup RAM 304, and the start count-based life warning value 503 may be made variable.

Figure 6:
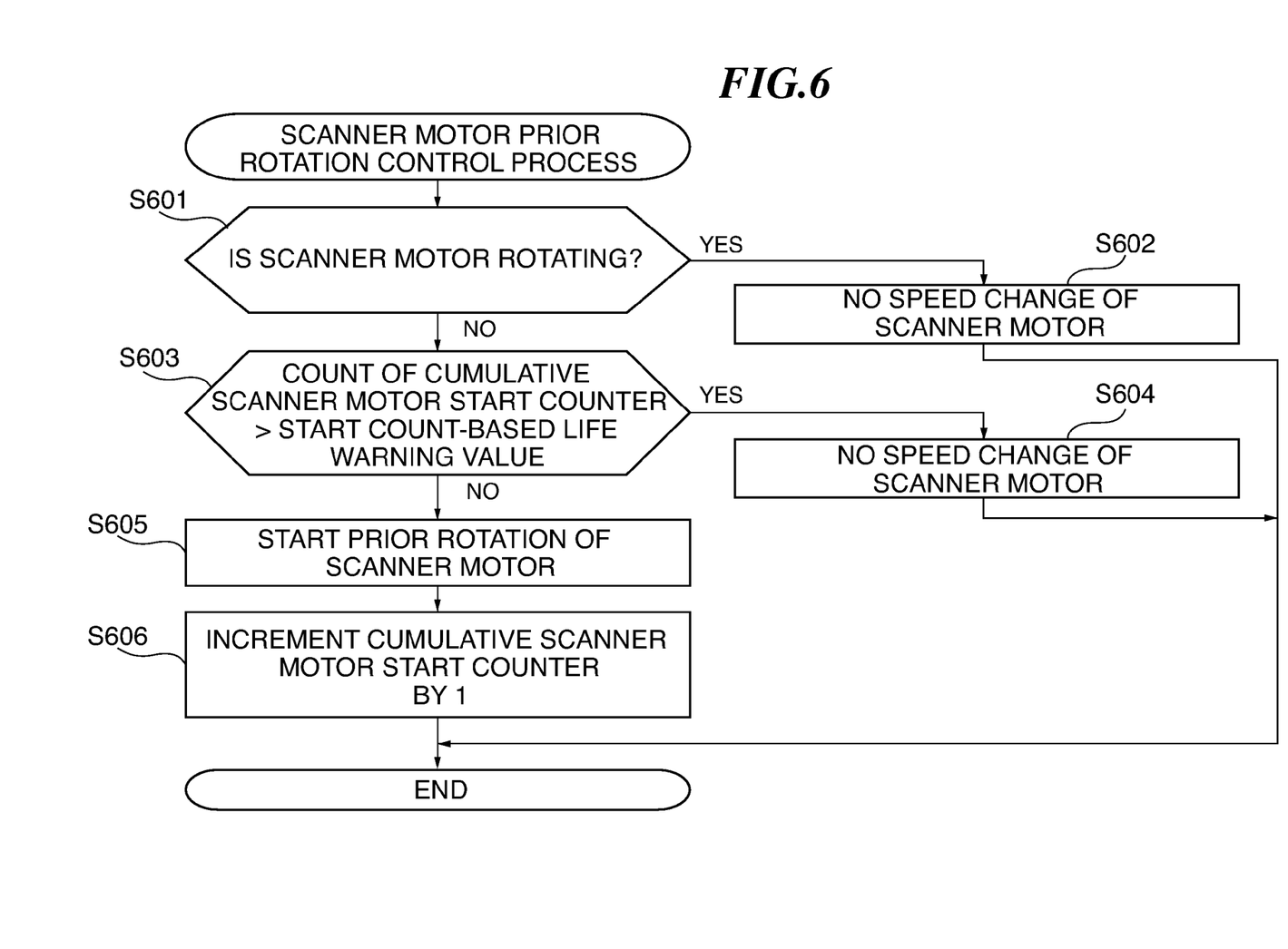
FIG. 6 is a flowchart of a scanner motor prior rotation control process which is executed by the control circuit shown in FIG. 3.

FIG. 6 is a flowchart of the scanner motor prior rotation control process which is executed by the control circuit in FIG. 3.

The present process is executed by the CPU 301 as the instruction section, as described hereinbefore, when it is detected that the user has carried out some operation on the image forming apparatus (i.e. in response to a sign of image formation).

Referring to FIG. 6, first, it is determined whether or not the scanner motor 102 is currently rotating (step S601) (rotation determining section). If the scanner motor 102 is currently rotating, the scanner motor 102 is kept rotating (step S602), followed by immediately terminating the present process.

If it is determined in the step S601 that the scanner motor 102 is not rotating, the remaining service life of the scanner motor 102 is determined (step S603). The remaining service life of the scanner motor 102 is determined by comparison between the count of the cumulative scanner motor start counter 305 and the start count-based life warning value 503.

If the count of the cumulative scanner motor start counter 305 is larger than the start count-based life warning value 503, it is judged that the remaining service life of the scanner motor 102 is not sufficient, speed change is not executed while holding the scanner motor 102 at rest (without starting the scanner motor 102) (step S604), followed by immediately terminating the present process.

On the other hand, if the count of the cumulative scanner motor start counter 305 is not larger than the start count-based life warning value 503, prior rotation of the scanner motor 102 is started (step S605). Then, the count of the cumulative scanner motor start counter 305 is incremented by 1 (step S606) (upcounter), followed by terminating the present process.

It should be noted that the count of the cumulative scanner motor start counter 305 is incremented not only at the start of the scanner motor prior rotation control, but also when the scanner motor 102 is started up from its stopped state so as to start a job or carry out automatic adjustment.

The scanner motor prior rotation control process shown in FIG. 6 is executed for each of the scanner motors associated with the respective colors. For this reason, even when only one of the scanner motors 102 was replaced at a different time due to failure or the like, or even when a scanner motor 102 associated with a specific color is different in service life from the others, it is possible to make proper determinations for prior rotation control.

According to the scanner motor prior rotation control process shown in FIG. 6, in prior rotation control executed when a sign of image formation occurs before the copy start instruction signal is generated, if the count of the cumulative scanner motor start counter 305 exceeds the start count-based life warning value 503 (YES to the step S603), it is judged that the remaining service life of the scanner motor 102 is not sufficient, and the scanner motor 102 is kept at rest (step S604), which makes it possible to prolong the service life of the scanner motor 102.

Figure 7:
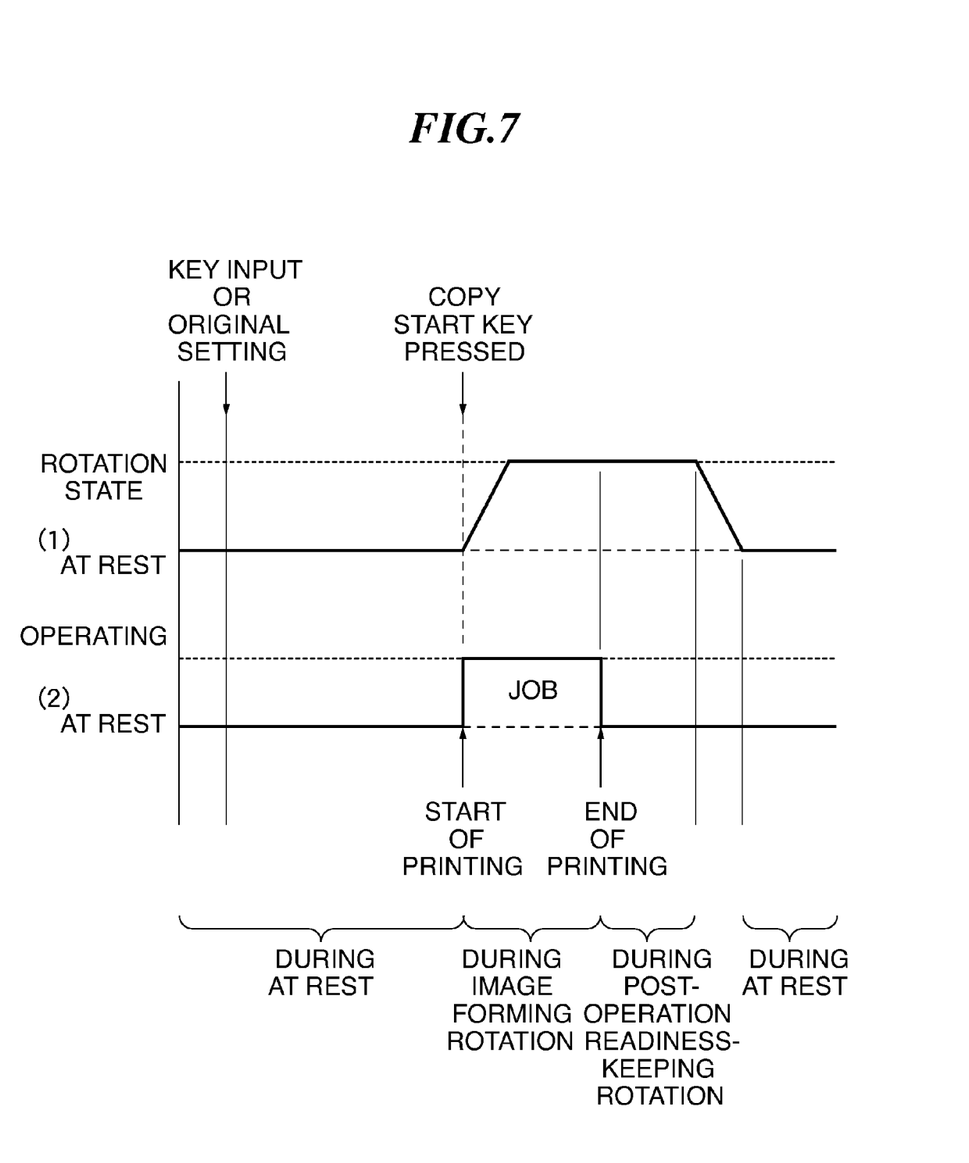
FIG. 7 is a timing diagram showing the relationship between the scanner motor and a job status in a case where it is determined in the scanner motor prior rotation control process in FIG. 6 that the scanner motor is to be kept at rest without executing speed change.

FIG. 7 is a timing diagram showing the relationship between the scanner motor and a job status in a case where it is determined in the scanner motor prior rotation control process in FIG. 6 that the scanner motor 102 is to be kept at rest without executing speed change.

Components forming FIG. 7 basically correspond to those in FIG. 4A. Reference numeral (1) designates the rotational speed of the scanner motor 102, and reference numeral (2) designates a print job operation signal.

When pressing of any key other than the copy start key on the operation panel 313 or opening or closing of that the presser plate 219 of the original reader 218 is detected, a polygon prior rotation trigger is generated. At this time, the CPU 301 executes the scanner motor prior rotation control process shown in FIG. 6. If the scanner motor 102 remains at rest, the scanner motor 102 is kept at rest without causing rotation thereof. Then, when the copy start key is pressed on the operation panel 313, a print job is started. At this time point, the scanner motor 102 starts rotation.

After completion of the print job, the scanner motor 102 is kept rotating over a predetermined time period for post-operation readiness-keeping rotation so as to keep ready for a next job, irrespective of the result of the determination performed in FIG. 6 as to the service life.

This processing is executed because the start count is a factor crucial to the service life of the scanner motor 102, and in cases where the user carries out copy jobs at short intervals while replacing originals, it can be considered to be advantageous in increasing the service life of the scanner motor 102 to hold the scanner motor 102 in the post-operation readiness-keeping rotation state.

Therefore, the scanner motor 102 is configured to be stopped after the lapse of a predetermined time period. However, if a copy job is input before the lapse of the predetermined time period, a printing operation is started again. In this case, the scanner motor 102 need not be started.

Figure 8:
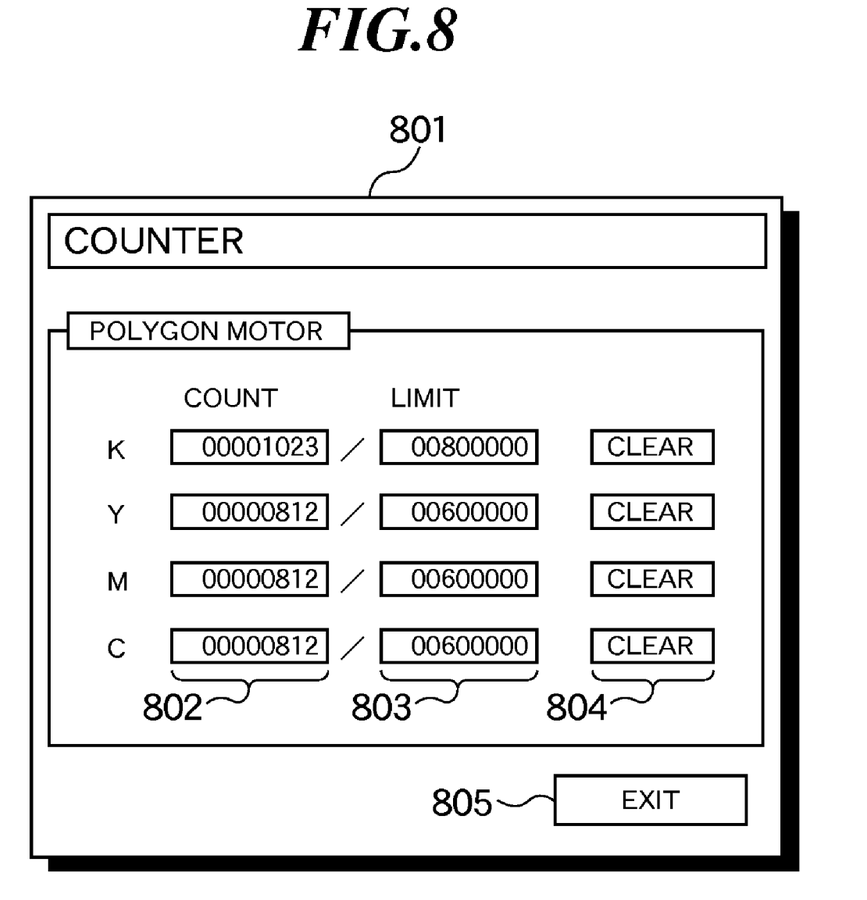
FIG. 8 is a view of a screen which is displayed on an operation panel appearing in FIG. 3 and is used for clearing a cumulative scanner motor start counter.

FIG. 8 is a view of a screen displayed on the operation panel appearing in FIG. 3, for clearing a cumulative scanner motor start counter.

As shown in FIG. 8, the counter display screen 801 shows cumulative scanner motor start counters associated with the respective scanner motors 102, and is displayed on the operation panel 313.

Arranged on the counter display screen 801 are a cumulative scanner motor start count display section 802 for displaying the current count of each of the cumulative scanner motor start counters 305, and a cumulative start count value display section 803 for displaying each start count-based life value 501 with reference to which the service life of the associated scanner motor 102 is determined to have expired.

Further, counter clear buttons 804 and a counter display screen exit button 805 are arranged on the counter display screen 801.

When one of the counter clear buttons 804 is pressed by user operation, the associated one of the cumulative scanner motor start counters 305 is initialized to 0. When the user presses the counter display screen exit button 805 after having confirmed the displayed values or carried out a counter clearing operation, the screen returns to the normal copy operation screen. Clearing of a cumulative scanner motor start counter 305 is carried out by pressing the associated counter clear button 804 when the associated laser scanner unit shown in FIG. 1 is replaced with a new one.

Although in the above described embodiment, the image reader 218 is not described as an ADF and the operations of the scanner motors 102 for printing are described by taking printing on a single sheet as an example, if the image reader 218 is implemented by an ADF which is capable of automatically feeding a plurality of sheets, the timer is reset whenever one sheet feeding operation is performed, just as it is when the user has carried out some operation on the image forming apparatus.

Further, in the above-described embodiment, the start of the scanner motor 102 is described as a spin-up operation for bringing the scanner motor 102 from the stopped state to the steadily rotating state, this is not limitative, but it is also possible to count an operation of increasing the rotational speed at which the scanner motor 102 is caused to rotate from a fixed speed lower than a steady rotational speed to the steady rotational speed, as a startup, to thereby predict the remaining service life of the scanner motor 102.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed embodiment. The scope of the following claims is to be accorded the broadest interpretation so as to encompass all such modifications and equivalent structures and functions.

This application claims the benefit of Japanese Patent Application No. 2006-162573, filed Jun. 12, 2006 which is hereby incorporated by reference herein in its entirety.

What is claimed is:

1. An image forming apparatus that forms a latent image on an image bearing member in response to a copy start instruction signal, comprising:
   a motor configured to drive a rotating polygonal mirror that scans the image bearing member by reflecting light, for rotation;
   a counter configured to count a number of times of start of said motor;
   an instruction section configured to be operable to cause said motor to be started up before the copy start instruction signal is generated, if a count of said counter is less than a predetermined value, and to cause said motor to be started up upon generation of the copy start instruction signal, if the count of said counter is not less than the predetermined value.

2. An image forming apparatus as claimed in claim 1, wherein said instruction section includes a detection unit configured to detect an operation performed on the image forming apparatus, and when the count of said counter is less than the predetermined value, causes said motor to be started up depending on a result of the detection by said detection unit before generation of the copy start instruction signal.

3. An image forming apparatus as claimed in claim 1, wherein said counter includes an up-counter configured to increment the count of said counter by 1 when said instruction section has caused said motor to be started up.

4. An image forming apparatus as claimed in claim 1, comprising a post-operation rotation control section configured to perform post-operation rotation control of said motor after completion of an image forming operation, so as to keep ready for a next image forming operation, irrespective whether the count of said motor is less than the predetermined value or not.

5. An image forming apparatus that forms a latent image on an image bearing member in response to a copy start instruction signal, comprising:

a motor configured to drive a rotating polygonal mirror that scans the image bearing member by reflecting light, for rotation at a predetermined speed;

a counter configured to count a number of times of start of said motor;

a rotation determining section configured to determine a rotational state of said motor; and an instruction section configured to be operable when said rotation determining section has determined that said motor is not rotating at the predetermined speed, to cause said motor to be started up before the copy start instruction signal is generated, if a count of said counter is less than a predetermined value, and to cause said motor to be started up upon generation of the copy start instruction signal, if the count of said counter is not less than the predetermined value.

6. An image forming apparatus as claimed in claim 5, wherein said instruction section includes a detection unit configured to detect an operation performed on the image forming apparatus, and when the count of said counter is less than the predetermined value, causes said motor to be started up depending on a result of the detection by said detection unit before generation of the copy start instruction signal.

* * * * *